United States Patent
Ho et al.

(10) Patent No.: US 9,111,686 B2
(45) Date of Patent: Aug. 18, 2015

(54) FLEXIBLE SUPERCAPACITOR AND PREPARATION METHOD THEREOF

(75) Inventors: Wen-Hsien Ho, New Taipei (TW); Chung-Bo Tsai, New Taipei (TW); Po-Chou Chen, New Taipei (TW); Yan-Ru Chen, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 343 days.

(21) Appl. No.: 13/585,021

(22) Filed: Aug. 14, 2012

(65) Prior Publication Data

US 2012/0304599 A1   Dec. 6, 2012

Related U.S. Application Data

(63) Continuation-in-part of application No. 13/397,883, filed on Feb. 16, 2012, and a continuation-in-part of application No. 13/572,728, filed on Aug. 13, 2012.

(30) Foreign Application Priority Data

Feb. 16, 2011   (TW) .............................. 100105123 A

(51) Int. Cl.
*H01G 9/022* (2006.01)
*H01G 9/00* (2006.01)
*H01G 11/56* (2013.01)
*B82Y 30/00* (2011.01)
*B82Y 99/00* (2011.01)

(52) U.S. Cl.
CPC ................ *H01G 9/038* (2013.01); *H01G 9/00* (2013.01); *H01G 9/155* (2013.01); *H01G 11/56* (2013.01); *B82Y 30/00* (2013.01); *B82Y 99/00* (2013.01); *H01M 2300/0082* (2013.01); *Y02E 60/13* (2013.01)

(58) Field of Classification Search
CPC ......... H01G 9/038; H01G 9/155; H01G 9/68; H01G 11/56; Y02E 60/13
See application file for complete search history.

(56) References Cited

U.S. PATENT DOCUMENTS

| | | | |
|---|---|---|---|
| 7,052,805 B2 | 5/2006 | Narang et al. | |
| 2002/0048143 A1* | 4/2002 | Lee et al. | 361/502 |
| 2002/0163771 A1* | 11/2002 | Volfkovich et al. | 361/502 |
| 2002/0167784 A1* | 11/2002 | Takatomi et al. | 361/502 |

(Continued)

FOREIGN PATENT DOCUMENTS

| | | |
|---|---|---|
| CN | 1130657 A | 9/1996 |
| CN | 1259773 A | 7/2000 |

(Continued)

OTHER PUBLICATIONS

Kaempgen et al., Bifunctional carbon nanotube networks for supercapacitors, 2007, Applied Physics Letters 90, 264104.*

(Continued)

*Primary Examiner* — David M Sinclair
(74) *Attorney, Agent, or Firm* — McClure, Qualey & Rodack, LLP

(57) ABSTRACT

A flexible supercapacitor and a preparation method thereof are provided. The flexible supercapacitor includes a polymer-based solid electrolyte layer, two active layers respectively disposed on opposite surfaces of the polymer-based solid electrolyte layer, and two electron conducting layers disposed on outer exposed surfaces of the two active layers.

11 Claims, 3 Drawing Sheets

(56) References Cited

U.S. PATENT DOCUMENTS

| | | | |
|---|---|---|---|
| 2003/0169558 A1* | 9/2003 | Olson et al. | 361/502 |
| 2006/0098382 A1* | 5/2006 | Miyagawa et al. | 361/272 |
| 2006/0269801 A1* | 11/2006 | Honbo et al. | 429/7 |
| 2008/0158779 A1* | 7/2008 | Lin et al. | 361/502 |
| 2010/0259866 A1* | 10/2010 | Shaffer et al. | 361/502 |
| 2011/0033705 A1* | 2/2011 | Komura et al. | 428/401 |
| 2012/0014038 A1* | 1/2012 | Meng et al. | 361/502 |

FOREIGN PATENT DOCUMENTS

| | | | |
|---|---|---|---|
| CN | 1439032 A | | 8/2003 |
| JP | 03132009 A | * | 6/1991 |
| KR | 2002-0072192 A | | 9/2002 |
| TW | 200718713 A | | 5/2007 |
| TW | 200903890 A | | 1/2009 |

OTHER PUBLICATIONS

"Studies on Li—Mn—O Systems as Cathode Materials for Lithium ion Batteries", Din-Goa Liu, Master thesis, National Taiwan University of Science and Technology (2000).*

English translation of abstract of "Studies on Li—Mn—O Systems as Cathode Materials for Lithium ion Batteries", Din-Goa Liu, Master thesis, National Taiwan University of Science and Technology (2000).*

B.K. Choi, Y.W. Kim, Materials Science and Engineering B107 (2004) 244-250.

Alexis Laforge, "All-textile flexible supercapacitors using electrospun poly(3,4-ethylenedioxythiophene) nanofibers" Journal of Power Sources 196 (2010) 559.

Ultracapacitor wears well, Aug. 15, 2011.

English translation of abstract of TW 200903890 A (published Jan. 16, 2009).

English translation of abstract of CN 1439032 A (published Aug. 27, 2003).

"New solid-state electric double-layer capacitor using poly(vinyl alcohol)-based polymer solid electrolyte", Takaki Kanbara et al, Journal of power sources,36 (1991) 87-93.

English translation of abstract of CN1130657A (published Sep. 1, 1996).

English translation of abstract of CN1259773A (published Jul. 12, 2000).

English translation of abstract of KR2002-0072192A (published Sep. 14, 2002).

English translation of abstract of TW200718713A (published May 15, 2007).

* cited by examiner

FLEXIBLE SUPERCAPACITOR AND PREPARATION METHOD THEREOF

CROSS-REFERENCE TO RELATED APPLICATION

This present application is a continuation-in-part of U.S. application Ser. No. 13/397,883, filed Feb. 16, 2012, which claims priority to Taiwanese Application Serial Number 100105123, filed Feb. 16, 2011. The present application is also a continuation-in-part of U.S. application Ser. No. 13/572,728, filed Aug. 13, 2012. The entire disclosures of all the above applications are hereby incorporated by reference herein.

BACKGROUND

1. Technical Field

The disclosure relates to a flexible power source. More particularly, the disclosure relates to a flexible supercapacitor.

2. Description of Related Art

The development of improved energy storage devices is one of the keys for a successful global energy management for a greener and more energy-balanced world. Especially, one of the challenges is the improvement of the transportability of the energy: more lightweight, more compact and more mechanically flexible energy storage devices are required for a significant number of applications, from wearable energy that could be incorporated into garments, to space applications where the cost by weight and volume is huge. But flexible power sources to operate them are only starting to catch up.

Supercapacitors, like batteries, can store energy and be used as a power source. While batteries store and release charge through chemical reactions, supercapacitors store it on the surface of their electrodes. Supercapacitors can charge in minutes instead of hours and can recharge millions of times. Although some flexible supercapacitors have been developed, the flexibility still faces challenges.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present invention is directed to a flexible supercapacitor, which comprises a polymer-based solid electrolyte layer, two active layers respectively disposed on opposite surfaces of the polymer-based solid electrolyte layer, and two electron conducting layers disposed on outer exposed surfaces of the two active layers.

The polymer-based solid electrolyte layer above comprises an organic polymer and a lithium salt in a weight ratio of 1:5 at most. According to an embodiment, the organic polymer can be polyvinyl alcohol (PVA) or sulfonated polyetheretherketone (SPEEK). The molecular weight of the PVA can be 20,000-186,000 Da, and the molecular weight of the SPEEK can be 10,000-50,000 Da.

According to another embodiment, the lithium salt above can be $LiClO_4$, $LiBF_4$, $LiPF_6$, $LiAsF_6$, $LiCF_3SO_3$, $LiBr$, $LiCF_3SO_3$, $LiN(CF_3SO_3)_2$ or any combinations thereof.

The active layers above are used for adsorbing ions.

According to an embodiment, the active layers can be carbon films comprising 10-15 wt % of conductive carbon black, 60-70 wt % of active carbon, and 15-30 wt % of the organic polymer above. The conductivity of the conductive carbon black is $10^1$-$10^2$ S/cm. The active carbon has a specific surface area of 1000-2000 $m^2$/g.

According to another embodiment, the active layers can be a layer of carbon nanotubes having a specific surface area of 100-400 $m^2$/g.

According to yet another embodiment, the layer of carbon nanotubes above can further comprise a binder, such as polyvinylidene difluoride (PVDF) or polytetrafluoroethylene (PTFE).

According to yet another embodiment, the active layers each comprises a carbon fiber cloth having a specific surface area of 1000-2000 $m^2$/g. An active carbon layer can be further disposed between the active layers and the electron conducting layers. The active carbon layer can further comprise a binder, such as PVDF or PTFE.

The electron conducting layers each comprises a carbon fiber cloth having a conductivity of 10 S/cm at least.

According to another embodiment, the supercapacitor further comprises a package layer for enclosing the electron conducting layers, the active layers and the polymer-based solid electrolyte layer. The material of the package layer can be an aluminum foil or a polymer film, such as polypropylene or polyethylene terephthalate.

In another aspect, a method for preparing the supercapacitor above is provided. The preparation method comprises the following steps. First, a first active layer, a polymer-based solid electrolyte layer, a second active layer, and a second electron conducting layer are sequentially stacked on a first electron conducting layer to form a supercapacitor assembly. Next, the supercapacitor assembly is compressed at a temperature from room temperature to 100° C. to bind the layers in the supercapacitor assembly. Then, the combined supercapacitor assembly is moistened with water, sulfuric acid solution, or a sulfate solution. Finally, the moistened supercapacitor assembly is packaged.

According to an embodiment, the concentration of the sulfuric acid solution or the sulfate solution is 0.1-1 M. The sulfate solution can be $LiSO_4$ solution or $NaSO_4$ solution.

Many of the attendant features will be more readily appreciated as the same becomes better understood by reference to the following detailed description considered in connection with the accompanying drawings.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Flexible Supercapacitor

Figure 1:
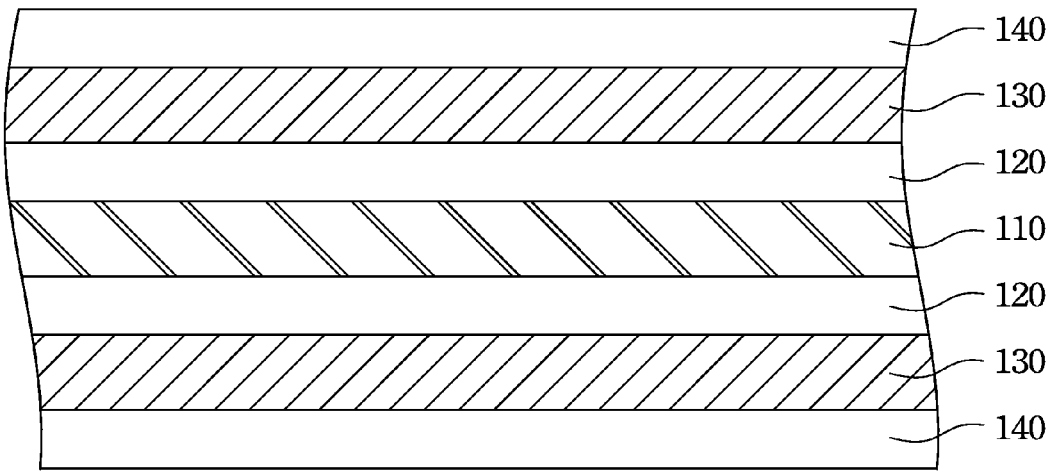
FIG. 1 is a cross-sectional diagram of a flexible supercapacitor according to an embodiment of this invention.

In one aspect, this invention provides a flexible supercapacitor. FIG. 1 is a cross-sectional diagram of a flexible supercapacitor according to an embodiment of this invention. In FIG. 1, a flexible supercapacitor 100 comprises a polymer-based solid electrolyte layer 110, two active layers 120 respectively disposed on opposite surfaces of the polymer-based solid electrolyte layer 110, and two electron conducting layers 130 disposed on outer exposed surfaces of the two active layers 120.

The polymer-based solid electrolyte layer 110 above comprises an organic polymer and a lithium salt in a weight ratio of 1:5 at most. Generally, the ionic conductivity of the polymer-based solid electrolyte layer 110 is higher when the lithium salt's content is higher. However, if the lithium salt's content is too high, white turbidities will occur in the polymer-based solid electrolyte layer 110, and a film of the polymer-based solid electrolyte layer 110 can be uneven. This may be caused by destroying the polymer's crystallinity by the over high lithium salt's content therein.

According to an embodiment, the organic polymer above can be polyvinyl alcohol (PVA) or sulfonated polyetheretherketone (SPEEK). Since the molecular weights of the PVA and SPEEK can affect the formation condition, such as drying temperature and drying time, and the mechanical strength, such as tensile strength, of the polymer-based solid electrolyte. The molecular weight of the PVA can be 20,000-186,000 Da, and the molecular weight of the SPEEK can be 10,000-50,000 Da. However, the molecular weights of the PVA and SPEEK are not limited to the values above.

According to another embodiment, the lithium salt above can be a lithium salt with lower lattice energy, $LiClO_4$, $LiBF_4$, $LiPF_6$, $LiAsF_6$, $LiCF_3SO_3$, LiBr, $LiCF_3SO_3$, $LiN(CF_3SO_3)_2$ or any combinations thereof. The lithium salt with lower lattice energy can increase the ionic conductivity of the polymer-based solid electrolyte layer 110.

The active layers 120 above are used for adsorbing ions. Generally, the larger the specific surface area is, the better the ion adsorbing capacity of the active layers 120 is. However, the storage capacitance of the supercapacitor 100 will be decreased when the specific surface area of the active layers 120 is too large. Therefore, the specific surface area of species in the active layer 120 for adsorbing ions is better to be 1000-2000 $m^2/g$, but is not limited thereto. The active layers 120 can be carbon films, a layer of carbon nanotubes, or carbon fiber clothes.

In the case of carbon films, the carbon films comprise 10-15 wt % of conductive carbon black, 60-70 wt % of active carbon, and 15-30 wt % of the organic polymer above. The conductive carbon black above is responsible for conducting electricity between the polymer-based solid electrolyte 100 and the electron conducting layers 130. Hence, the conductivity of the conductive carbon black is better to be $10^1$-$10^2$ S/cm. The active carbon above is the species responsible for adsorbing ions. Hence, the active carbon is better to have a specific surface area of 1000-2000 $m^2/g$. The polymer above, such as PVA or SPEEK, is uses as a binder to help film formation. The polymer above is also used for increase the affinity between the polymer-based solid electrolyte layer 110 and the active layers 120.

In the case of carbon nanotubes, carbon nanotubes can play the roles of both electricity conductor and ions adsorbent. Since the specific surface area is limited by the geometry of carbon nanotubes, the specific surface area of the carbon nanotubes is better to be 100-400 $m^2/g$. Optionally, the carbon nanotubes can be further mixed with a binder, such as polyvinylidene difluoride (PVDF) or polytetrafluoroethylene (PTFE), to help film formation.

In the case of carbon fiber clothes, the carbon fiber clothes also can play the roles of both electricity conductor and ions adsorbent. The specific surface area of the carbon fiber clothes is better to be 1000-2000 $m^2/g$. Furthermore, the conductivity of the interface between the carbon fiber clothes and the polymer-based solid electrolyte layer 110 can be further increased by disposing a layer of active carbon layer between the polymer-based solid electrolyte layer 110 and the carbon fiber clothes. The active carbon layer can further comprise a binder to help film formation. The binder can be polyvinylidene difluoride (PVDF) or polytetrafluoroethylene (PTFE).

The electron conducting layers 130 are responsible for electrical conducting between the supercapacitor 100 and an outer electronic device. Therefore the conductivity of the electron conducting layers 130 can be 10 s/cm at least, such as 10-20 s/cm. The electron conducting layers 130 can comprise a soft conductive material, such as carbon fiber clothes.

According to another embodiment, the flexible supercapacitor 100 can further comprises package layers 140 to enclose the electron conducting layers 130, the active layers 120 and the polymer-based solid electrolyte layer 110. The material of the package layer 140 can be an aluminum foil or a polymer film, such as a film of polypropylene or polyethylene terephthalate.

Preparation Method of Flexible Capacitor

Figure 2:
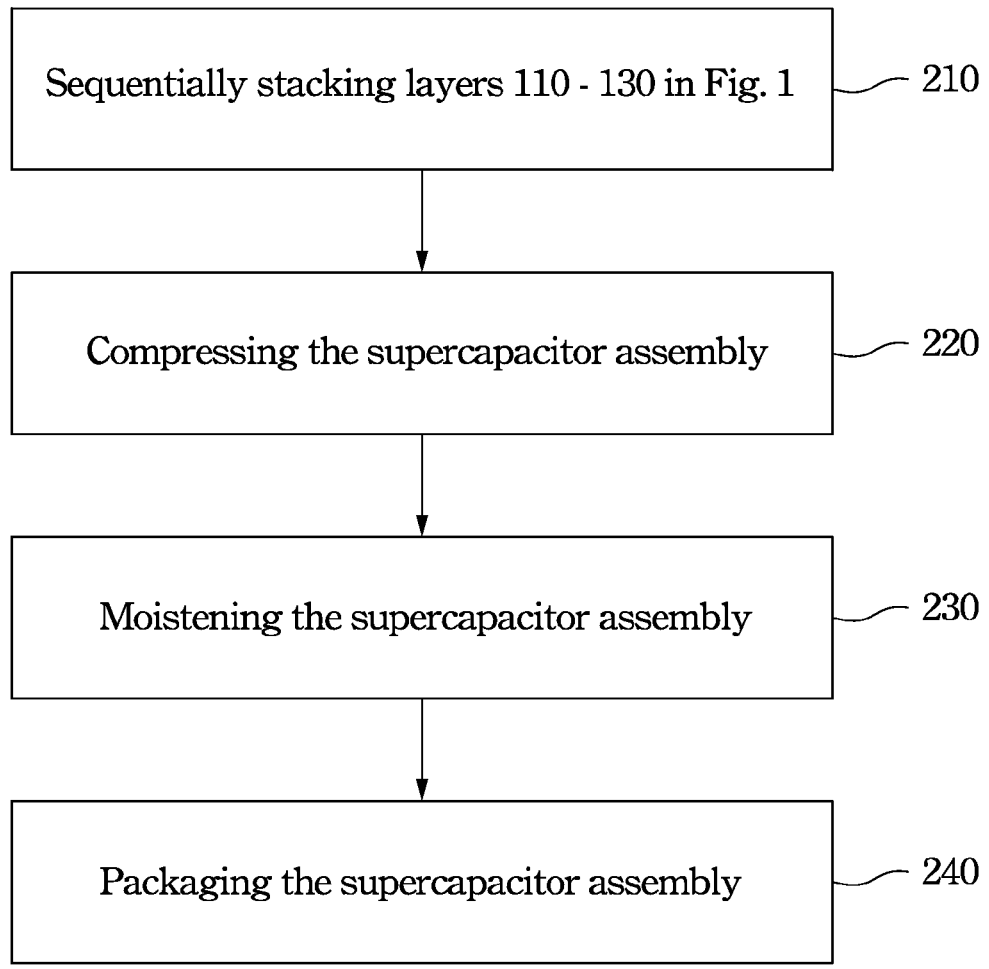
FIG. 2 is a process flow diagram of preparing the flexible capacitor above.

In another aspect, this invention also provides a preparation method of the flexible capacitor above. FIG. 2 is a process flow diagram of preparing the flexible capacitor above.

In FIG. 2, the first step 210 is sequentially stacking layers 110-130 in FIG. 1. Therefore, the layers 110-130 are stacked in the order of the (first) electron conducting layer 130, the (first) active layer 120, the polymer-based solid electrolyte layer 110, the (second) active layer 120, and the (second) electron conducting layer 130 to form a supercapacitor assembly.

In step 220, the layers 110-130 are compressed at room temperature to 100° C. to bind the layers 110-130 together.

In step 230, the bound supercapacitor assembly can be moistened by water, sulfuric acid solution, or a sulfate solution to increase the ionic conductivity, and thus increase the capacitance of the flexible supercapacitor 100. The moistening time for the bound supercapacitor can be 1-60 seconds.

In step 240, the moistened supercapacitor assembly can be further packaged by the package layer 140.

Cyclic Voltammetry Analysis

In this embodiment, the layers of the flexible supercapacitor were a first carbon fiber cloth, a first carbon film, a SPEEK solid electrolyte layer, a second carbon film, and a second carbon fiber cloth, sequentially. The supercapacitor assembly was moistened by water, and then tested by cyclic voltammetry analysis. The size of the flexible supercapacitor was 30 mm×30 mm×1.5 mm. The obtained result of the cyclic voltammetry analysis was shown in FIG. 3.

Figure 3:
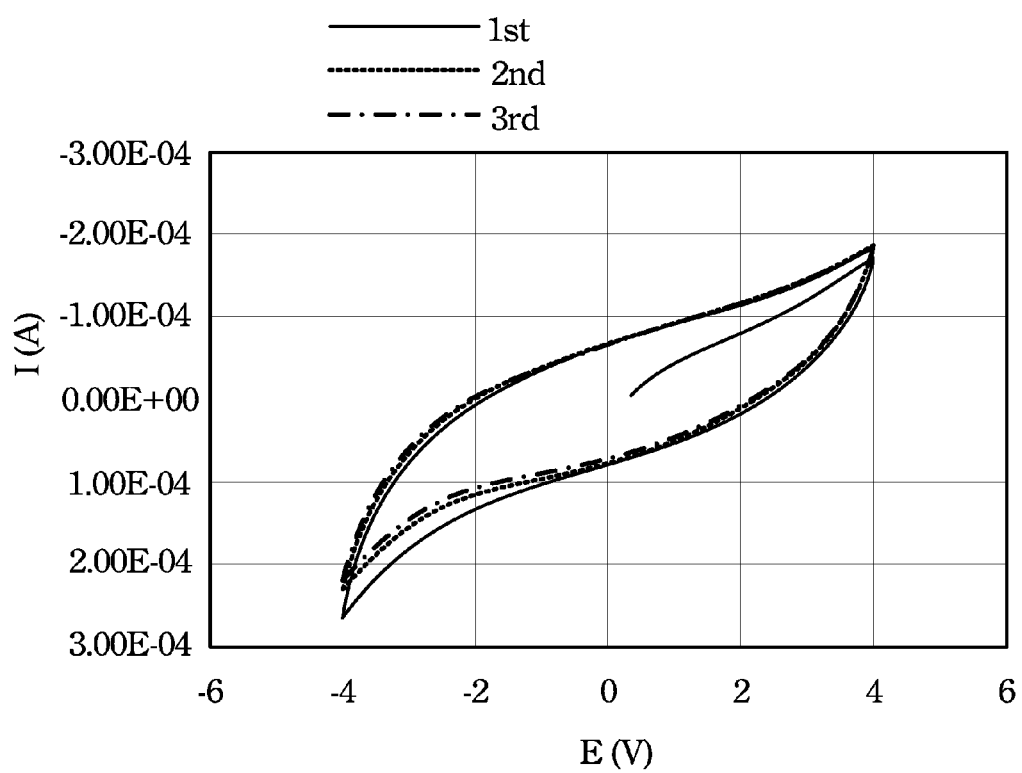
FIG. 3 is a result of cyclic voltammetry analysis.

From FIG. 3, it can be known that this tested flexible supercapacitor could be operated under ±4 V without any peaks corresponding to oxidation or reduction reactions. The integrated area within the circled area was about 54 mF, which corresponded to the storage capacitance of this tested flexible capacitor. The equivalent series resistance (ESR) of this tested supercapacitor is about 354 Ω.

From the results above, it can be know that this tested flexible supercapacitor could be operated in a wider voltage window than common commercial single-cell electrochemical capacitors. Common commercial single-cell electrochemical capacitors usually have an upper voltage limit below 3.5 V. Therefore, for high-voltage applications, multiple commercial cells in series have to be used.

In light of foregoing, the flexible supercapacitor disclosed above can operate at a temperature up to 120-130° C. and in a broad voltage windows between ±4 V. Therefore, the flexible supercapacitor disclosed above can be used in a wider range of applications. This is an important breakthrough for flexible supercapacitors.

All the features disclosed in this specification (including any accompanying claims, abstract, and drawings) may be replaced by alternative features serving the same, equivalent or similar purpose, unless expressly stated otherwise. Thus, each feature disclosed is one example only of a generic series of equivalent or similar features.

What is claimed is:

1. A flexible supercapacitor, comprising:
a polymer-based solid electrolyte layer comprising sulfonated polyetheretherketone (SPEEK) and a lithium salt in a weight ratio of 1:5 at most, wherein a molecular weight of the SPEEK is 10,000-50,000 Da;
two active layers for adsorbing ions respectively disposed on opposite surfaces of the polymer-based solid electrolyte layer; and
two electron conducting layers disposed on outer surfaces of the two active layers, wherein the electron conducting layers comprise a carbon fiber cloth having a conductivity of 10 S/cm at least.

2. The flexible supercapacitor of claim 1, wherein the lithium salt is $LiClO_4$, $LiBF_4$, $LiPF_6$, $LiAsF_6$, $LiCF_3SO_3$, LiBr, $LiCF_3SO_3$, $LiN(CF_3SO_3)_2$ or any combinations thereof.

3. The flexible supercapacitor of claim 1, wherein the active layers are carbon films comprising 10-15 wt % of conductive carbon black, 60-70 wt % of active carbon, and 15-30 wt % of the organic polymer.

4. The flexible supercapacitor of claim 3, wherein conductivity of the conductive carbon black is $10^1$-$10^2$ S/cm.

5. The flexible supercapacitor of claim 3, wherein a specific surface area of the active carbon is 1000-2000 $m^2/g$.

6. The flexible supercapacitor of claim 1, wherein the active layers comprises carbon fiber clothes having a specific surface area of 1000-2000 $m^2/g$.

7. The flexible supercapacitor of claim 1, wherein the active layers comprise carbon nanotubes having a specific surface area of 100-400 $m^2/g$.

8. The flexible supercapacitor of claim 7, wherein the active layers further comprise a binder.

9. The flexible supercapacitor of claim 1, further comprising a package layer for enclosing the electron conducting layers, the active layers and the polymer-based solid electrolyte layer.

10. The flexible supercapacitor of claim 9, wherein a material of the package layer is an aluminum foil or a polymer film.

11. The flexible supercapacitor of claim 10, wherein a material of the polymer film is polypropylene or polyethylene terephthalate.

* * * * *